United States Patent
Gebert

(10) Patent No.: US 8,036,005 B2
(45) Date of Patent: Oct. 11, 2011

(54) SWITCHING APPARATUS FOR GROUNDING AN INVERTER

(75) Inventor: Bernd Gebert, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 269 days.

(21) Appl. No.: 12/378,199

(22) Filed: Feb. 12, 2009

(65) Prior Publication Data

US 2009/0244938 A1    Oct. 1, 2009

(30) Foreign Application Priority Data

Mar. 31, 2008 (EP) .................................. 08006585

(51) Int. Cl.
*H02H 7/122* (2006.01)
*H02H 5/04* (2006.01)

(52) U.S. Cl. .......................... 363/55; 361/104

(58) Field of Classification Search .................. 323/906; 363/50, 55, 56.01; 361/41, 42, 93.1, 93.8, 361/93.9, 94, 103, 104; 324/500, 550
See application file for complete search history.

(56) References Cited

U.S. PATENT DOCUMENTS

| | | | | |
|---|---|---|---|---|
| 6,101,073 | A * | 8/2000 | Takehara | 361/42 |
| 6,686,744 | B1 * | 2/2004 | Tinsley | 324/507 |
| 7,148,698 | B2 * | 12/2006 | Becker et al. | 324/550 |
| 7,576,547 | B2 * | 8/2009 | Muller | 324/522 |
| 7,768,751 | B2 * | 8/2010 | Gilmore et al. | 361/42 |
| 2006/0227472 | A1 * | 10/2006 | Taylor et al. | 361/42 |
| 2008/0055941 | A1 * | 3/2008 | Victor et al. | 363/17 |
| 2008/0194154 | A1 * | 8/2008 | Minnick | 439/842 |
| 2008/0303625 | A1 * | 12/2008 | Ding | 337/208 |

FOREIGN PATENT DOCUMENTS

| | | |
|---|---|---|
| DE | 32 33 862 | 3/1983 |
| DE | 199 33 566 | 3/2001 |
| EP | 0 342 101 | 11/1989 |
| FR | 2 309 121 | 11/1976 |
| GB | 2 436 403 | 9/2007 |

OTHER PUBLICATIONS

SMA Technologie AG: "Sunny Boys & Co.: Für jades Modul die passende Lösung", Sunny Boy Info, (Online), Bd. 2007, Nr. 02, Jun. 2007, pp. 4-5; XP002495222, Niestetal URL: http://download.sma.de/smaprosa/dateien/1371/SBINF037-11-AD2207.pdf—Sep. 9, 2008, p. 5.

Conrad Electronic GmbH: "Hauptkatalog 2006", Bd. 2005/2006, 2005, p. 640,1099,1100, XP002495223 Hirschau, pp. 640, 646, p. 1099-p. 1100.

* cited by examiner

*Primary Examiner* — Adolf Berhane
*Assistant Examiner* — Emily Pham
(74) *Attorney, Agent, or Firm* — Eschweiler & Associates, LLC

(57) ABSTRACT

A switching apparatus for grounding an inverter (3) that converts a direct current voltage into an alternative current voltage at mains frequency, with an inverter housing (7) and with a safety fuse (8) that connects a positive or a negative direct current voltage to a grounding terminal, is intended to be provided such that a technician has the possibility of grounding an inverter appliance optionally positively or negatively at little expense, with the possibility for an IP-65 region of the appliance to remain closed. This is achieved in that a safety fuse (8), which is accessible and can be plugged from the outside, is arranged on said inverter housing (7) and can be contacted optionally to a positive or a negative direct current voltage in such a manner that either a positive or a negative direct current voltage is grounded through said safety fuse (8).

9 Claims, 4 Drawing Sheets

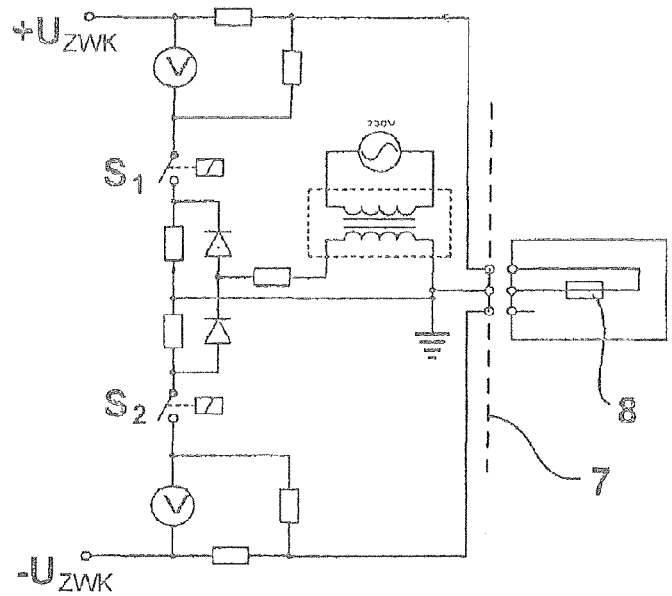

Fig. 7

Overview about properties of the variants

|  | Var 1 | Var 2 | Var 3 | Var 4 |
|---|---|---|---|---|
| Detection of a ground fault in the center of the generator | - | X | - | X |
| Just a SINGLE assembly – no US-version required | X | X | X | X |
| Precise R_iso measurement possible | - | X | - | X |
| Grounding set retrofittable anytime | X | X | X | X |
| Fuse current can be monitored | X | X | X | X |
| Intended and unintended grounding can ALWAYS be distinguished | - | - | X | X |
| A defective fuse can be detected. In case of a hard ground fault on the already grounded side (GFDI/grounding set), the fuse will blow before connection to grid. | - | - | X | X |

Fig. 8

SWITCHING APPARATUS FOR GROUNDING AN INVERTER

FIELD OF THE INVENTION

The invention relates to a switching apparatus for grounding an inverter with a direct current voltage that converts a direct current voltage into an alternative current voltage at mains frequency, with a safety fuse that connects a positive or a negative direct current voltage to a grounding terminal.

DESCRIPTION OF THE PRIOR ART

It is known to equip photovoltaic inverters with what is termed a GFDI fuse in the appliance. Through this fuse, a current can be monitored by means of a current converter. As soon as this current exceeds a limit value, the appliance is disconnected from the grid. If the current persists, a current path is interrupted by the blowing of the fuse. The inverter can signalize that a fault current of e.g., more than 1 A has flown and does not switch on the grid as long as the failure has not been eradicated and the fuse replaced.

The circuits used suffer from the disadvantage that an undesired hard earth connection on the side already grounded by the fuse can only be detected by the technician by means of a measuring instrument. It may happen that the fuse blows as soon as the inverter is added in the circuit of the photovoltaic plant but that the plant does not notice the blowing of the fuse as automatic distinction between a desired and an undesired hard earth connection is not possible.

The regulations referring to GFID fuses and to the grounding of photovoltaic generators differ from continent to continent or from country to country. For it is possible to ground either the positive or the negative generator voltage. In the USA for example, a GFDI (Ground Failure Detector and Interrupter) safety fuse is required.

As a standard, for instruments intended for USA the fuse is clamped either on the negative or on the positive side of the grounding terminal PE.

It is known to accommodate the fuse inside the inverter housing and to ground either the positive or the negative generator voltage through the fuse by changing the plugging. What is referred to as a jumper is helpful to indicate on which voltage side the grounding has to occur.

To change the type of grounding, the housing lid must be opened. Since photovoltaic inverters are often provided with a high IP rating in terms of contact and water protection and are more specifically rated IP 65, changing and replacing the fuse is cumbersome.

Methods of determining the insulation resistance Riso are also known, which detect a fault either on the positive side or on the negative side or on both. Switches or measurement shunts are utilized to measure the insulation resistance.

Inverters having a fuse for grounding the solar generator are known.

BRIEF SUMMARY OF THE INVENTION

It is the object of the invention to provide a switching apparatus of the type mentioned herein above by means of which a technician can, at little expense, optionally ground an inverter either positively or negatively with the possibility for the IP-65 region of the instrument to remain closed. Whether the inverter is grounded positively or negatively depends on the type of the solar cells used to build the solar generator.

Moreover, the apparatus is intended to be implemented for a client to have the possibility to ground the inverter at a later stage depending on the solar generator used, a measurement of the isolation resistance Riso being possible in order to also perform a GFDI function, thus allowing ascertaining the condition of the fuse.

This object is achieved in that a fuse, which is accessible and can be plugged from the outside and which is protected against contact, is arranged on the inverter housing and can be contacted to a positive or negative direct current voltage in such a manner that either a positive or a negative direct current voltage is grounded through the safety fuse.

Thanks to the safety fuse of the invention, the lid of the instrument can remain closed and different groundings can be readily realized.

Additionally, it is possible to measure the insulation resistance Riso in order to check the condition of the fuse.

In the cases in which the fuse is missing, it can be found out whether there is an insulation fault in the measured field.

For the invention relies on the observation that these circuits have one thing in common with respect to grounding. All the circuits are related to the ground potential which is defined by the pluggable safety fuse of the invention. It relies on the idea not to consider these points or aspects separately but to make use of this common feature and to combine all the three solutions.

Both the Riso measurement and the fuse are components of a circuit for GFDI (Ground Failure Detector and Interrupter) monitoring.

Other advantageous implementations of the invention are indicated in the dependent claims.

In an advantageous development of the apparatus of the invention there is provided that the safety fuse is arranged in a plug connector part to be plugged outside of the inverter housing and having at least three plug connectors and is connected between two of said connectors, at least three mating contacts corresponding to the plug connector part being provided on the inverter housing, namely for the positive, the negative direct current voltage and for the grounding terminal, said plug connector part being configured so that it may be unplugged and plugged somewhere else for either the positive or the negative direct current voltage to be grounded.

Appropriately, the plug connectors of the fuse are configured to be prongs and those of the instrument to be sockets. Three contacts can for example be arranged one above the other or in a side-by-side relationship. As a result, the safety plug can be readily rotated 180° and plugged in order to change grounding from positive to negative and reverse. This offers an effect of benefit if the plug is intended to be flat.

It is particularly advantageous that the safety fuse is embedded in a cup-like part carrying the three plug connectors. As a result, high IP rating, e.g., IP-65 can be readily realized. A seal can be easily placed between the cup and the inverter housing. Thus, the socket, which more specifically interrogates a coding to know whether grounding has to be positive or negative and which also establishes the contact with the grounding fuse, can be mounted in the inverter housing. Practically, there is provided a cup with a counterpart for the socket, said cup containing the fuse and being adapted to be plugged in two directions. The first plug direction would be the positive grounding, the second direction, the negative grounding. In cross section, the cup can be circular, flat rounded or have another shape. Moreover, the cup solution offers the advantage that the fuse can be readily replaced.

In another advantageous implementation of the invention, the plug connector part comprises an electrical and/or mechanical plug coding. It is thus made certain that wrong connection of the ground potential is avoided. A mechanical coding can for example be provided through coding pins or similar. Electric coding of the plug direction can be realized through an additional diode mounted in series with the fuse, said diode being additionally integrated in the cup. As a result, one has two additional contacts. The contacts allow evaluating the flow direction of the diode so as to find out whether it is the positive or the negative side of the generator, which is grounded. This is important in order to know whether there is an unwanted hard earth connection.

In the inverter, an isolation resistance Riso with at least one shunt lying in the direct current path is preferably measured. There are more specifically provided two shunts, the first shunt lying on a positive current path and the second shunt on the negative current path, two switches being preferably utilized to establish different measurement conditions for determining the isolation resistance Riso, the first switch lying between the positive direct current voltage and the grounding terminal and the second switch between the negative direct current voltage and the grounding terminal. As a result, a first measurement during which the first switch is open and the second switch closed and a second measurement during which the first switch is closed and the second switch is open are possible. The two measurements show isolation faults that are simultaneously directed against a positive and against a negative voltage. A real isolation resistance Riso can thus be acquired with accuracy.

In order to make it possible to check the fuse, there is provided, in accordance with a development of the invention, to utilize a monitoring unit for monitoring a fault current flowing through the fuse. The fault current can be a wanted or an unwanted hard earth connection. Then, a defective fuse can be detected. In case of a hard fault on the already grounded side, the fuse will blow even before the plant is switched into the grid. Additionally, a distinction can be made between wanted and unwanted grounding.

The invention is advantageously used in connection with an inverter having a transformer for galvanic isolation. On the direct current side, the grounding induced by the transformer can be made by the fuse.

An exemplary embodiment will be explained in closer detail with reference to the drawings and other advantageous developed implementations of the invention and advantages thereof will be described. In said drawing:

BRIEF DESCRIPTION OF THE DRAWING

FIG. 7 shows an illustration of a fourth circuit variant of the apparatus, and FIG. 8 shows a synopsis of the properties of the apparatus shown in a table.

DETAILED DESCRIPTION OF THE INVENTION

Figure 1:
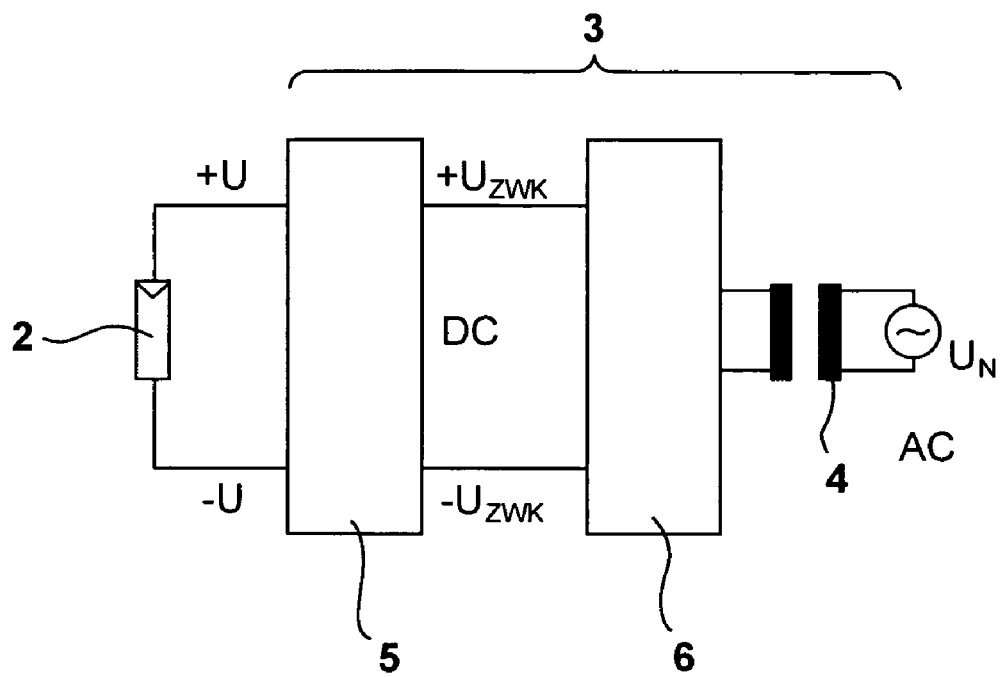
FIG. 1 shows a schematic illustration of a photovoltaic inverter.

In the Figs., same parts are provided with the same reference numerals.

FIG. 1 shows a photovoltaic plant 1 with a photovoltaic generator 2, with an inverter 3 having a transformer 4 for galvanic isolation between the DC side and the AC or grid side. The inverter can be configured to be a string inverter or an individual inverter so that one has the direct current voltages +U and −U.

The inverter 3 may incorporate a boost and/or a buck converter 5. A bridge circuit 6 with semi-conductor switch elements serves as the DC/AC converter circuit. The inverter 3 converts the direct current voltage +U/−U into an alternating current voltage at mains frequency $U_N$, which is e.g., rated 110/220/380 V and 50/60 Hz. The inverter 3 can have a pulse-width control as well as an MPP control.

The generator 2 can be grounded on the positive side or on the negative side.

Figure 2:
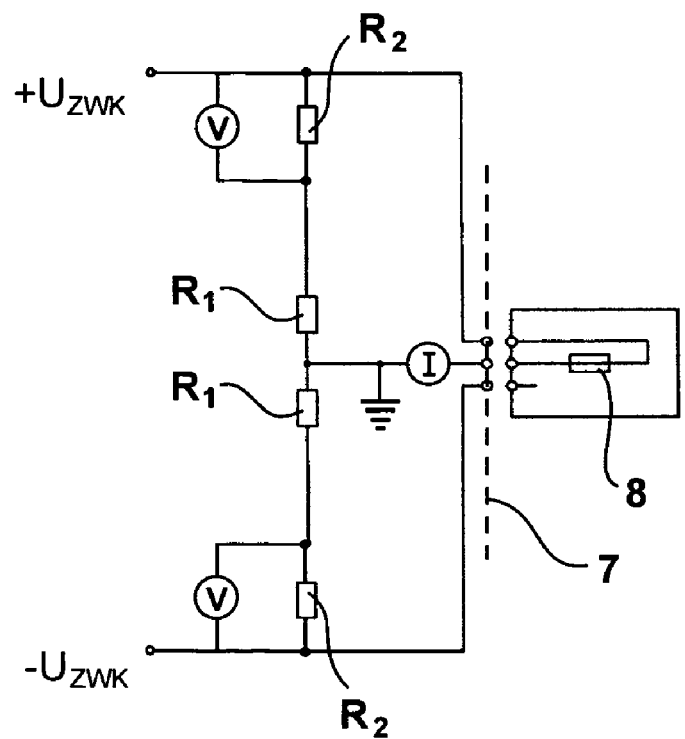
FIG. 2 shows an illustration of a first circuit variant of an apparatus of the invention.

FIG. 2 shows a switching apparatus for grounding the inverter 3 or the generator 2. The inverter 3 incorporates an inverter housing that is indicated at 7. A safety fuse 8 connects the one positive or negative direct current voltage +Uzwk, −Uzwk to a grounding terminal PE.

In accordance with the invention, the safety fuse 8, which is accessible and pluggable from the outside, is disposed on the inverter housing 7. The fuse 8 is contactable optionally on a positive or negative direct current voltage in such a manner that either the positive or the negative direct current voltage is grounded through the safety fuse 8, meaning is connected to the PE.

Further, the circuit shown in FIG. 2 incorporates a monitoring unit for monitoring a fault current flowing through the safety fuse, in particular for monitoring an unwanted hard earth connection. The circuit consists of two respective voltage dividers ($R_1$, $R_2$) that are grounded to earth. By measuring the voltage at R2, it may be found out for example whether the fuse 8 is there; when the fuse is there, the voltage is 0 on the grounded side. In the event of a hard grounding fault, meaning when the fuse blows, the voltage of PE will increase to a potential which, in terms of voltage, ranges between the solar generators, meaning the voltage is divided between the solar generators.

Figure 3:
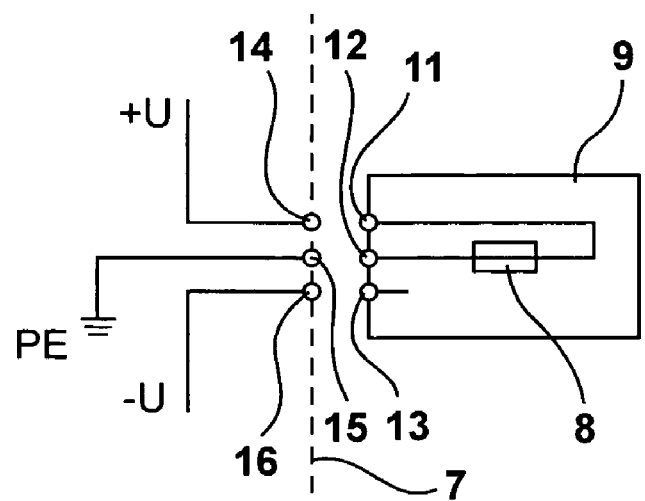
FIG. 3 shows an enlarged schematic diagram of a plug part of a fuse.

As shown in FIG. 3, the safety fuse 8 is preferably disposed in a plug connector part 9 with three plug connectors 11, 12, 13 that can be plugged outside of the inverter housing 7 and is mounted between two of the connectors 11 and 13. On the inverter housing 7 there are provided three mating contacts 14, 15, 16, which correspond to the plug connector part 9. The mating contacts 14, 15, 16 are connected to the positive, the negative direct current voltage +U/−U and to the grounding terminal PE.

The plug connector part 9 is configured to be plugged either to ground the positive or the negative direct current voltage +U/−U via the fuse 8.

The safety fuse 8 is in particular embedded in a cup-like part 17, which carries the three plug connectors 11, 12, 13. Said plug connectors are configured to be plugs, which engage in sockets on the housing 7.

The cup-like part 17 or the cup has for example a cylindrical shape that may at least but also partially extend conically. The cup has a closed cup bottom 18 and a detachable cup lid 20 which guide the plug connectors 11, 12, 13. Other embodiments such as rectangular implementations of the plug connector part 9 are also possible. The plug connector part 9 has at least a housing 22 for the fuse 8, which fulfills the IP rating IP-65. This fuse is accessible through the lid 20 or 18.

The plug connector part 9 can be plugged so that either the first plug connector 11 encounters the first mating contact 14 or that the plug connector 11 encounters the third mating contact 16. For this purpose, it merely needs to be rotated.

Thus, one can choose between a positive voltage or a negative voltage grounding without a lid of the inverter 3 having to be opened.

Figure 4:
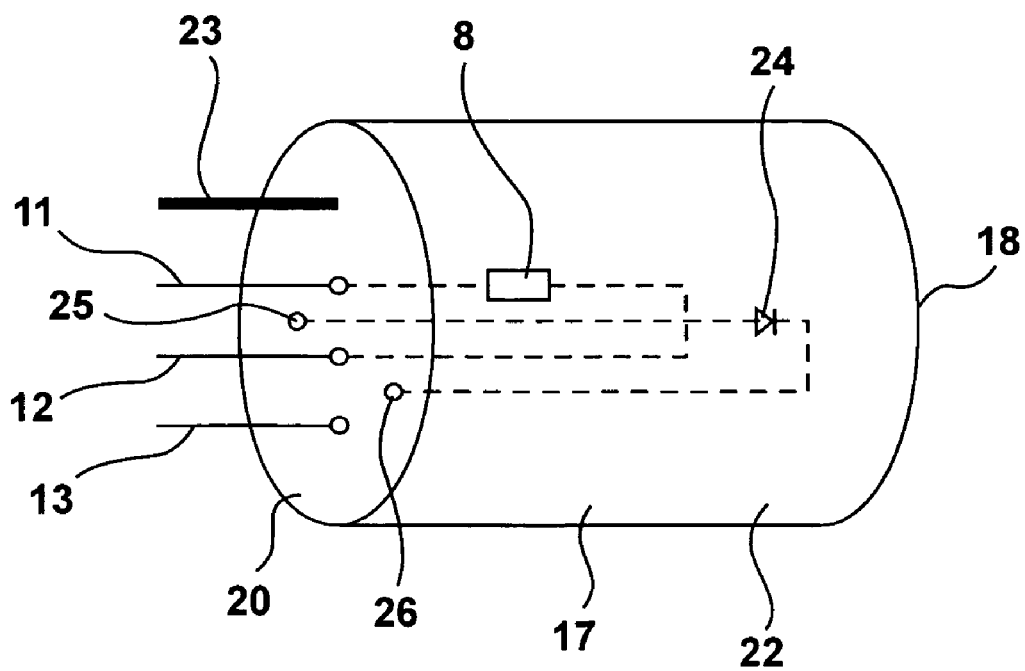
FIG. 4 shows an enlarged perspective illustration of a handwheel shown in FIG. 3.

As shown in FIG. 4, the plug connector part 9 has at least one mechanical plug coding 23 and/or one electric coding through contacts 25, 26. The electric coding 25, 26 incorporates a diode 24 in order to detect whether the grounding is positive or negative. For this purpose, contacts 25, 26 are provided in the cup. Through the contacts, the flow direction of the diode is evaluated, which is indicative of whether it is the positive or the negative side of the generator that is grounded. In the event of mechanical coding, which can be made by a pin 23 with a corresponding opening on the housing 7, the plug connector part 9 can only be plugged in two defined positions.

Figure 5:
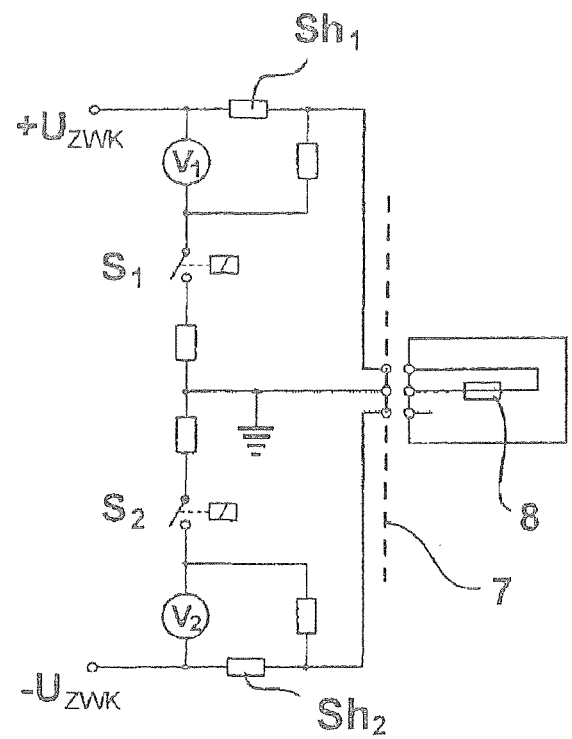
FIG. 5 shows an illustration of a second circuit variant of the apparatus.

FIG. 5 shows a circuit variant that allows for accurate measurement of the isolation resistance and that detects an earth connection of the generator 2. There are more specifically provided two shunts Sh1, Sh2, the first shunt Sh1 lying on the positive current path and the second shunt Sh2 on the negative current path. These shunts serve to indirectly measure the fuse current. The current flowing through the resistances Sh1 and Sh2 causes the voltage to increase to V1 or V2. The switches S1 and S2 serve for accurate measurement of the isolation resistance Riso. The first switch S1 lies between the positive direct current voltage +Uzwk and the earth connection PE and the second switch S2 lies between the negative direct current voltage −Uzwk and the earth connection PE. In the first condition or step of the measurement, the switch S1 is open and the switch S2 closed and in the second condition or step of measurement, the switch S2 is open and the switch S1 closed. The switches are controllable switches such as relays.

Figure 6:
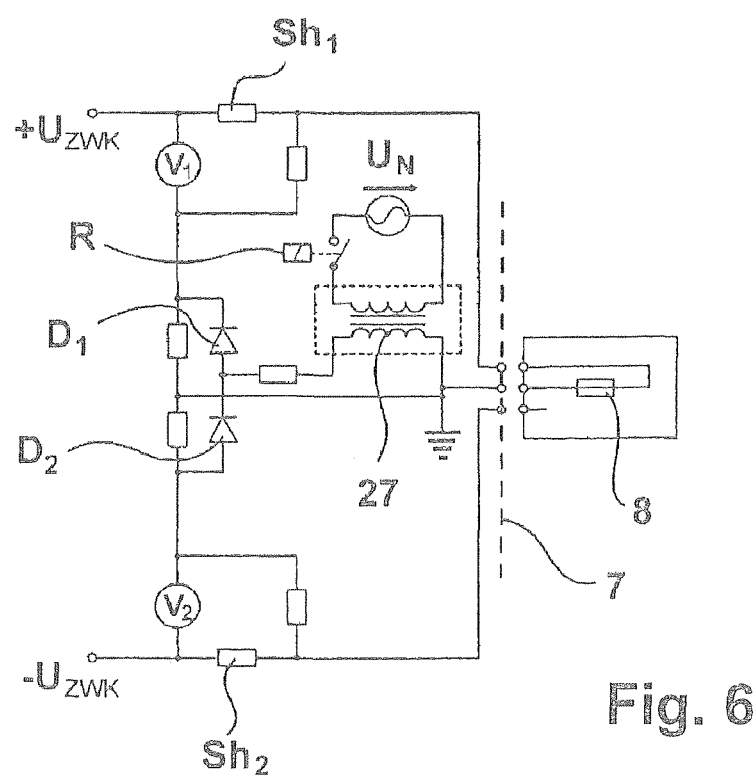
FIG. 6 shows an illustration of a third circuit variant of the apparatus.

According to FIG. 6, an alternating current voltage is coupled in through a transformer 27. The current is divided through diodes D1 and D2, which respectively carry different half-waves. The alternating current voltage can be the grid voltage $U_N$. The alternating current voltage can be added to the circuit through a controllable switch such as a relay R. The voltage dividers shown in FIG. 2 are kept. As a result, the current is monitored by the fuse 8.

In the third circuit variant shown in FIG. 6, it is possible to also make the distinction between a wanted and an unwanted earth connection. Here, a defective fuse can always be detected. In the event of a hard earth fault on the already grounded side, the fuse will blow even before intrusion. The circuit incorporates the shunts Sh1 and Sh2 of FIG. 5 and the voltage dividers shown in FIG. 2.

The embodiment shown in FIG. 7 is a combination of the circuits shown in FIG. 6 and in FIG. 5.

In FIG. 8, a table summarizes the properties of the respective circuit variants shown in FIG. 2 (Var 1), FIG. 5 (Var 2), FIG. 6 (Var 3), FIG. 7 (Var 4).

Thanks to the invention, the photovoltaic inverter 3 can be equipped with a GFDI safety fuse in the instrument. Through this fuse, a current can be monitored by means of the current converter. As soon as this current exceeds a limit value, the inverter 3 is disconnected from the grid. If the current continues to flow, a current path is interrupted by the blowing of the safety fuse 8. The inverter 3 can signalize that a fault current of for example more than 1 A has flown and does not switch over to the grid as long as the fault has not been eliminated and the fuse replaced.

The circuits used and shown in FIG. 6 and in FIG. 7 offer the advantage that an unwanted hard earth connection on the side already grounded by the fuse must no longer be measured with an additional measuring instrument. It can no longer happen that the fuse blows immediately upon adding the inverter to the circuit of the photovoltaic plant and that the plant does not detect the blowing of the fuse. It is always possible to automatically make a distinction between a wanted and an unwanted hard earth connection.

Thanks to the invention, regulations can be met, in particular in the USA. There, a GFDI safety fuse and the grounding of photovoltaic generators are required. It is also possible to ground the positive as well as the negative generator voltage.

The invention is not limited to this example; the fuse can be contacted from the outside in a way other than in a cup part.

Also, any single feature that has been described or shown can be combined with any other feature.

LIST OF REFERENCE NUMERALS

1 photovoltaic plant
2 photovoltaic generator
3 inverter
4 transformer
5 boost or buck chopper
6 bridge circuit
7 inverter housing
8 safety fuse
9 plug connector part
10
11, 12, 13 plug connectors
14, 15, 16 mating contacts
17 cup-like part
18 cup bottom
19
20 cup lid
21
22 housing
23 plug coding
24 electrical coding
25 mechanical plug coding
26 pin
27 current converter

I claim:
1. An inverter, including an inverter housing, comprising:
inverter circuitry configured to convert a direct current voltage to an alternative current voltage at a grid frequency, the inverter circuitry located inside the inverter housing, and comprising three terminals extending to an external surface of the housing corresponding to a positive direct current voltage terminal, a ground terminal, and a negative direct current terminal of the inverter circuitry, respectively; and
a safety fuse external to the inverter housing, configured to selectively connect one of the positive or negative direct current voltage terminals of the inverter circuitry to the ground terminal, wherein the safety fuse is configured within a plug connector part comprising at least two plug connector terminals configured to engage at least two of the three terminals on the external surface of the housing, wherein in a first orientation, the safety fuse connects the positive direct current voltage terminal of the inverter circuitry to the ground terminal, and wherein in a second, different orientation the safety fuse connects the negative direct current voltage terminal of the inverter circuitry to the ground terminal,
wherein the plug connector part further comprises one of a mechanical plug coding or an electrical plug coding operable to provide an indication of the first or second orientation.

2. The inverter of claim 1, wherein the plug connector part of the safety fuse comprises a cup-like housing comprising three plug connectors.

3. The inverter of claim 1, wherein the inverter circuitry further comprises a monitoring circuit configured to measure or otherwise detect a current measurement through the safety fuse.

4. The inverter of claim 3, wherein the monitoring circuit further comprises two shunts, wherein a first shunt of the two shunts lies on a positive current path of the inverter circuitry and a second shunt of the two shunts lies on a negative current path of the inverter circuitry.

5. The inverter of claim 3, wherein the monitoring circuit further comprises two switches configured to establish different measurement conditions for determining an isolation resistance, wherein a first switch of the two switches lies between the positive direct current voltage terminal and the ground terminal, and a second switch of the two switches lies between the negative direct current voltage terminal and the ground terminal.

6. The inverter of claim 1, further comprising a monitoring unit configured to monitor a fault current flowing through the safety fuse.

7. The inverter of claim 1, wherein the inverter circuitry further comprises a transformer configured to provide for galvanic separation.

8. The inverter of claim 3, wherein the monitoring circuit further comprises a selectively activatable alternating current voltage source coupled via a transformer to a current detection circuit operable to detect a current in the monitoring circuit in a condition when the safety fuse is coupled to the inverter circuitry and has not blown, thereby enabling a determination of a condition of the safety fuse without the inverter being coupled to the grid.

9. A safety fuse device in combination with an inverter circuit, comprising:
   a plug connector part comprising at least two plug terminals;
   a safety fuse housed within the plug connector part, and coupled between two of the at least two plug terminals, wherein the safety fuse is operable to provide a short circuit between the two of the at least two plug terminals in a first state, and provide an open circuit between the two of the at least two plug terminals in a second state,
   wherein the safety fuse is configured to interface with three plug terminals of the inverter circuit in two different orientations, wherein in a first orientation the safety fuse device couples together a positive direct current voltage terminal and a ground terminal of the inverter circuit, and in a second, different orientation couples together a negative direct current voltage terminal and the ground terminal of the inverter circuit, and
   wherein the plug connector part further comprises one of a mechanical plug coding or an electrical plug coding operable to provide an indication of the first or second orientation.

* * * * *